US006922031B2

(12) United States Patent
Engelgau et al.

(10) Patent No.: US 6,922,031 B2
(45) Date of Patent: Jul. 26, 2005

(54) DOOR ACTUATION SYSTEM WITH HELICAL CABLE

(75) Inventors: Steven John Engelgau, Royal Oak, MI (US); Shelley Lynn Bess, Royal Oak, MI (US); Christopher Matthew Radjewski, Sterling Heights, MI (US); Ian Christopher Hoare, West Bloomfield, MI (US); Joseph Allen Wilbanks, II, Hermitage, TN (US); Rajesh J. Somnay, Troy, MI (US); Silvio M. Yamada, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/463,462

(22) Filed: Jun. 17, 2003

(65) Prior Publication Data

US 2004/0257012 A1 Dec. 23, 2004

(51) Int. Cl.[7] .................................................. B60J 5/04
(52) U.S. Cl. ......................................... 318/286; 318/16
(58) Field of Search ......................... 318/280, 286–293, 318/16, 466–470

(56) References Cited

U.S. PATENT DOCUMENTS

| | | | | | |
|---|---|---|---|---|---|
| 3,675,371 | A | * | 7/1972 | Golde et al. | 49/352 |
| 3,681,874 | A | * | 8/1972 | Golde et al. | 49/352 |
| 4,143,281 | A | * | 3/1979 | Appley | 296/146.12 |
| 5,461,826 | A | * | 10/1995 | Heckel et al. | 49/28 |
| 5,793,173 | A | * | 8/1998 | Henschel et al. | 318/467 |
| 5,986,420 | A | * | 11/1999 | Kato | 318/272 |
| 6,199,322 | B1 | * | 3/2001 | Itami et al. | 49/139 |
| 6,425,206 | B1 | * | 7/2002 | Noda et al. | 49/360 |
| 6,464,287 | B2 | * | 10/2002 | Rogers et al. | 296/155 |
| 6,637,286 | B2 | * | 10/2003 | Friedrich et al. | 74/501.6 |

* cited by examiner

*Primary Examiner*—Bentsu Ro
(74) *Attorney, Agent, or Firm*—Carlson, Gaskey & Olds

(57) ABSTRACT

A door actuation system conducts or assists movement of sliding vehicle doors by connecting the door to a bi-directional motor via one or more helical cables that engage with gearing on the bi-directional motor. Rotation of the motor in either direction pushes or pulls the helical cables, causing the door to move toward the open or closed position. The motor can be stopped when the door reaches selected positions other than the open or closed position, holding the door in a partially open position.

13 Claims, 1 Drawing Sheet

DOOR ACTUATION SYSTEM WITH HELICAL CABLE

TECHNICAL FIELD

The present invention relates to door actuation systems and, more particularly, to a door actuation system for sliding vehicle doors.

BACKGROUND OF THE INVENTION

Many vehicles incorporate sliding vehicle doors to make opening and closing doors easier. This is particularly true for vehicles that have larger, heavier doors that are difficult to swing. Even with the help of a sliding mechanism, however, many sliding doors are still too heavy and cumbersome to move without some form of mechanical assistance.

Door actuation systems may be incorporated to assist users in opening and closing a vehicle door. The actuation systems generally include a detector that detects when a user is starting to move a door and a motor mechanically coupled to the door to move the door in the same direction as the detected movement. The motor can either provide limited power to assist the user in door movement or provide enough power to move the door on its own, without requiring any user assistance. Currently available door actuation systems tend to have complex structures with many moving parts, however, making fabrication cumbersome and expensive.

There is a desire for a simplified door actuation system that can assist users in opening and closing sliding vehicle doors.

SUMMARY OF THE INVENTION

The present invention is directed to a door actuation system for conducting or assisting movement of sliding vehicle doors. The door actuation system connects a vehicle door to a bi-directional motor via one or more helical cables that engage with gearing on the bi-directional motor. Rotation of the motor in either direction pushes or pulls the helical cables, causing the door to move toward the open or closed position.

In one embodiment, helical cables are attached to both the top and bottom of the door and rotate within tracks. Selected positions along the track correspond to a fully open door, a partially open door, and a closed door. When the door reaches a selected position, the motor stops rotation, stopping rotation of the helical cables as well and thereby stopping movement of the door. By stopping rotation of the motor, the invention securely holds the door at any desired position along the track without requiring additional door stopping mechanisms in the track.

DETAILED DESCRIPTION OF THE EMBODIMENTS

Figure 1:
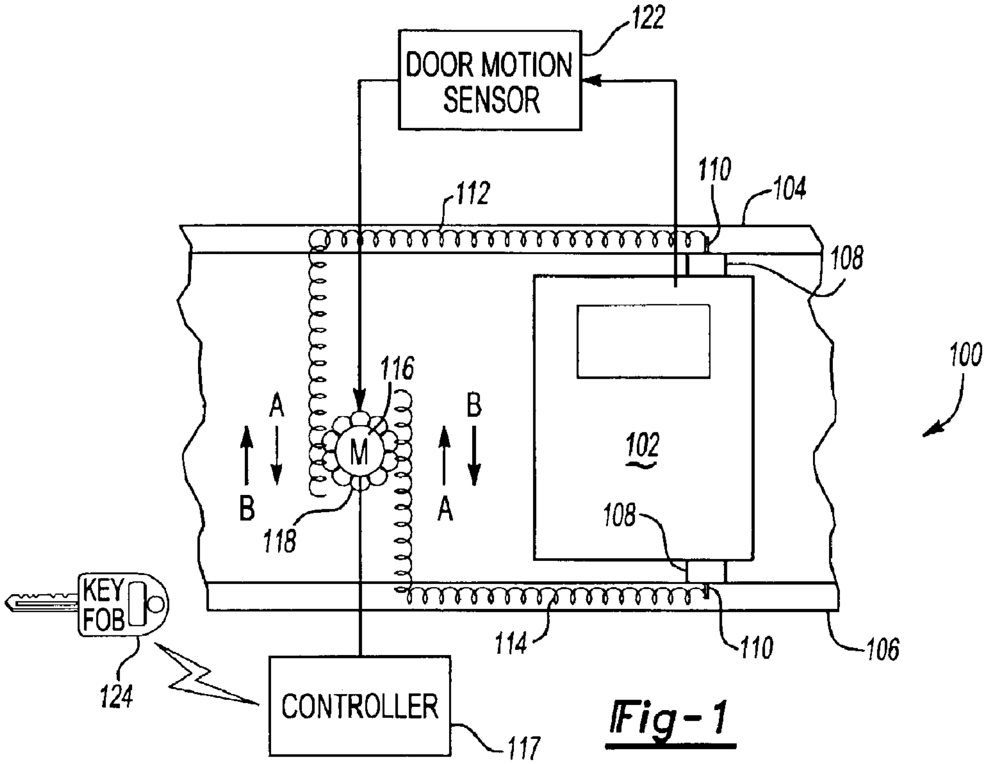
FIG. 1 is a representative diagram of a door actuation system according to one embodiment of the invention.

FIG. 1 is a representative diagram of a door actuation system 100 according to one embodiment of the invention. A vehicle door 102 is supported in a top track 104 and a bottom track 106 by a coupling mechanism, such as a guide 108 and pin 110 structure, attached to the top and bottom of the door 102. The top track 104 and the bottom track 106 are formed in a vehicle body (not shown) and are shaped according to a desired travel path of the door 102. The guide 108 and pin 110 ensure that the door 102 stays in the tracks 104, 106 as it is moved.

Preferably, a top helical cable 112 is disposed in the top track 104 and a bottom helical cable 114 is disposed in the bottom track 106. However, the door actuation system may work with a single helical cable 112, 114 disposed in either the top or bottom track 104, 106. One end of each cable 112, 114 is attached to the guide 108 and pin 110, and the other end of each cable 112, 114 is operatively coupled to a bi-directional motor 116. The helical cables 112, 114 are attached to the guide 108 and pin 110 by any known device or process, such as crimping. In one embodiment, the bi-directional motor 116 has gearing 118 that engages with the surface of the helical cables 112, 114 so that movement of the motor 116 pulls or pushes the helical cables 112, 114, thereby actuating the door. More particularly, rotation of the motor 116 causes the cables 112, 114 to advance or retract, depending on the rotational direction.

Figure 3:
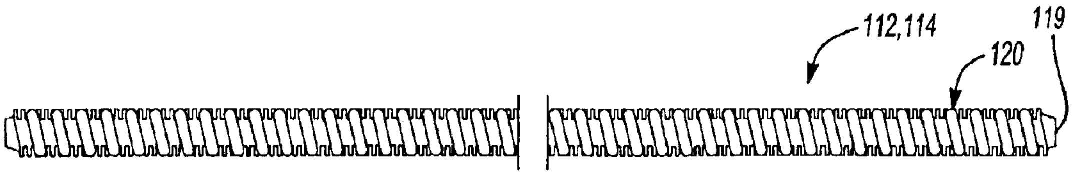
FIG. 3 is a diagram illustrating one possible structure for a helical cable used in one embodiment of the invention.

FIG. 3 illustrates one possible structure for the helical cable 112, 114. The structure of the helical cables 112, 114 should be thick enough and durable enough to withstand the weight and repeated movement of the door 102. In one embodiment, multiple cables are spun together to form a thick base cable bundle 119. A helical structure 120 is then formed around the bundle to provide a surface that can engage with the gearing 118 on the motor 116.

In the example shown in FIG. 1, counterclockwise rotation of the motor 116 will cause the cables 112, 114 to move in the direction shown by arrows A, moving the door 102 toward the open position. Conversely, clockwise rotation of the motor 116 will cause the cables 112, 114 to move in the direction shown by arrows B, moving the door 102 toward the closed position. The motor 116 may be actuated via any known manner, such as through a sensor 122 that detects movement of the door or through a command from a key fob 124. Further, the motor 116 itself may be controlled by any known processor 117 and/or software. The free ends of the cables 112, 114 may be guided by a tubular track system hidden inside the interior trim panel of the vehicle to restrain them from uncontrolled movement as the motor 116 operates. The motor 116 can be designed to assist movement of the door 102 after detecting user actuation of the door 102 or to automatically move the door 102 in response to a user-initiated actuation signal (e.g., by actuation of a push button switch on the key fob 124 or the door 102).

Figure 2:
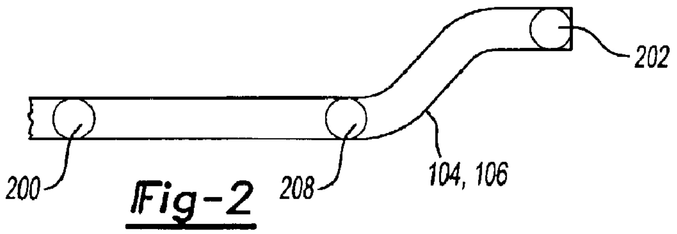
FIG. 2 is a representative diagram of a track configuration in which one embodiment of the invention operates.

Referring to FIG. 2, the motor 116 can be controlled so that it stops when the guide 108 and pin 110 stop at one or more selected locations on the tracks 104, 106 in addition to locations corresponding to an open door location 200 and a closed door location 202. Note that the tracks 104, 106 may have a bend 206 to cinch the door in place so that it is flush with the vehicle exterior when the door is closed.

In one embodiment, the motor 116 is controlled so that it stops the door when the guide 108 and pin 110 are at a partially open position 208. This function is useful for larger vehicles having multiple rows of seats where the door 102 does not need to be completely open to access a selected seat row. The motor 116 then rotates, moving the helical cables 112, 114 until the guide 108 and pin 110 reach the partially open position 208. At that point, the motor 116 stops rotating, stopping the movement of the cables 112, 114 and thereby holding the door 102 in the partially open position. When the motor 116 is instructed to resume rotation (e.g., by a processor instruction or user actuation of the door), the cable movement will resume door 102 movement toward the fully open 200 or fully closed 202 position.

As a result, the inventive structure provides a simple, reliable door actuation mechanism for sliding vehicle doors. By using helical cables that engage with gearing on a bi-directional motor, the invention offers a robust way to mechanically assist door actuation while minimizing the number of moving parts in the door actuation system.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An actuation system for a sliding vehicle door, comprising:

a bi-directional motor having a gear surface;

at least one helical cable having a cable surface engaged with the gear surface;

a coupling mechanism connecting a vehicle door to the at least one helical cable, wherein rotation of the bi-directional motor in a first rotational direction rotates the at least one helical cable to pull the vehicle door in a first direction and rotation of the bi-directional motor in a second rotational direction rotates the at least one helical cable to push the vehicle door in a second direction; and a door motion sensor that actuates the bi-directional motor to drive the at least one helical cable when the door motion sensor detects motion of the vehicle door.

2. The actuation system of claim 1, wherein the at least one helical cable comprises a first helical cable connected to a top portion of the vehicle door and a second helical cable connected to a bottom portion of the vehicle door.

3. The actuation system of claim 1, wherein the coupling mechanism comprises a guide and pin structure.

4. The actuation system of claim 1, wherein the at least one helical cable is disposed in a track.

5. The actuation system of claim 1, wherein the first direction moves the vehicle door toward an open position and the second direction moves the vehicle door toward a closed position.

6. The actuation system of claim 1, wherein detected motion of the vehicle door is manual movement of the vehicle door to either an open or closed position, and the bi-directional motor drives the at least one helical cable to assist in the manual movement.

7. An actuation system for a sliding vehicle door, comprising:

a bi-directional motor having a gear surface;

an upper helical cable and a lower helical cable, wherein the upper and lower helical cables each have a cable surface engaged with the gear surface;

an upper track that houses the upper helical cable and a lower track that houses the lower helical cable, wherein the upper and lower tracks are to be disposed in a vehicle frame;

an upper coupling mechanism for connecting a top portion of a vehicle door to the upper helical cable and a lower coupling mechanism for connecting a bottom portion of the vehicle door to the lower helical cable, wherein rotation of the bi-directional motor in a first rotational direction rotates the upper and lower helical cables to pull the vehicle door toward an open position and rotation of the bi-directional motor in a second rotational direction rotates the upper and lower helical cables to push the vehicle door toward a closed position; and a door motion sensor that actuates the bi-directional motor to drive one of the upper and lower helical cables when the door motion sensor detects motion of the vehicle door.

8. The actuation system of claim 7, wherein the upper and lower coupling mechanisms each comprises a guide and pin structure.

9. The actuation system of claim 7, further comprising a motor controller that controls the operation of the bi-directional motor.

10. The actuation system of claim 9, wherein the motor controller stops motor rotation when the vehicle door is in a partially open position between the open position and the closed position.

11. The actuation system of claim 7, wherein detected motion of the vehicle door is manual movement of the vehicle door to either the open or closed position, and said bi-directional motor drives said upper and lower helical cables to assist in said manual movement.

12. An actuation system for a sliding vehicle door, comprising:

a bi-directional motor having a gear surface;

at least one helical cable having a cable surface engaged with the gear surface;

a coupling mechanism connecting a vehicle door to the at least one helical cable, wherein rotation of the bi-directional motor in a first rotational direction rotates the at least one helical cable to pull the vehicle door in a first direction and rotation of the bi-directional motor in a second rotational direction rotates the at least one helical cable to push the vehicle door in a second direction; and a controller coupled to the bi-directional motor, wherein the controller actuates the bi-directional motor when the controller receives an actuation signal, said actuation signal being received from a hand-held remote transmitter.

13. An actuation system for a sliding vehicle door, comprising:

a bi-directional motor having a gear surface;

an upper helical cable and a lower helical cable, wherein the upper and lower helical cables each have a cable surface engaged with the gear surface;

an upper track that houses the upper helical cable and a lower track that houses the lower helical cable, wherein the upper and lower tracks are to be disposed in a vehicle frame;

an upper coupling mechanism for connecting a top portion of a vehicle door to the upper helical cable and a lower coupling mechanism for connecting a bottom portion of the vehicle door to the lower helical cable, wherein rotation of the bi-directional motor in a first rotational direction rotates the upper and lower helical cables to pull the vehicle door toward an open position and rotation of the bi-directional motor in a second rotational direction rotates the upper and lower helical cables to push the vehicle door toward a closed position; and a controller coupled to the bi-directional motor, wherein the controller actuates the bi-directional motor when the controller receives an actuation signal, the actuation signal being received from a hand-held remote transmitter.

* * * * *